United States Patent [19]

Hogg

[11] 4,435,865

[45] * Mar. 13, 1984

[54] FRAME FOR COMB HONEY

[76] Inventor: John A. Hogg, 2225 S. 36th St., Galesburg, Mich. 49053

[*] Notice: The portion of the term of this patent subsequent to May 18, 1999 has been disclaimed.

[21] Appl. No.: 302,273

[22] Filed: Sep. 15, 1981

Related U.S. Application Data

[63] Continuation-in-part of Ser. No. 120,951, Feb. 13, 1980.

[51] Int. Cl.³ .................. A01K 47/02; A01K 47/04
[52] U.S. Cl. ......................................... 6/2 R; 6/10; 6/11
[58] Field of Search ............... 6/2 R, 2 A, 10, 11

[56] References Cited

U.S. PATENT DOCUMENTS

| | | |
|---|---|---|
| 31,658 | 3/1861 | Daniels et al. ............... 6/2 R |
| 154,874 | 9/1874 | Leedy ............................. 6/10 |
| 243,674 | 6/1881 | Forncrook .................... 6/2 R |
| 337,143 | 3/1886 | Foster ........................... 6/2 R |
| 338,647 | 3/1886 | Shuck ............................ 6/2 R |
| 427,993 | 5/1890 | Hopkins ........................ 6/2 R |
| 452,366 | 5/1891 | Ferguson ...................... 6/2 R |
| 529,116 | 11/1894 | Ferguson ...................... 6/2 R |
| 846,396 | 3/1907 | Calvert et al. ................ 6/10 |
| 929,616 | 7/1909 | Maxwell et al. .............. 6/2 R |
| 993,551 | 5/1911 | Rogers .......................... 6/2 R |
| 995,070 | 6/1911 | Linblom ........................ 6/2 R |
| 1,042,907 | 10/1912 | Gebhart ......................... 6/2 R |
| 1,637,002 | 7/1927 | Koepp ........................... 6/10 |
| 1,722,169 | 7/1929 | Yater ............................. 6/10 |
| 2,023,959 | 12/1935 | Knox ............................. 6/10 |
| 2,604,643 | 7/1952 | Hamilton ...................... 6/10 |
| 3,088,135 | 5/1963 | Covington .................... 6/10 |
| 3,187,353 | 6/1965 | Ackerman ..................... 6/10 |
| 4,195,379 | 4/1980 | Krasnik ......................... 6/10 |
| 4,329,749 | 5/1982 | Hogg ............................. 6/2 R |

FOREIGN PATENT DOCUMENTS 2023395 1/1980 United Kingdom ............... 6/10

OTHER PUBLICATIONS

John A. Hogg, "A New Comb Honey Concept the Half Comb Section", American Bee Journal, May 1980, pp. C357–361.
The A. I. Root Co., Medina, Ohio, in "1979 Bee Supplies" Catalog, p. 12.

Primary Examiner—Gene Mancene
Assistant Examiner—Kris R. Schulze
Attorney, Agent, or Firm—Flynn, Thiel, Boutell & Tanis

[57] ABSTRACT

Device for making comb honey includes sections arrangeable in a super. The section combines into a single unit a number of presently used separate components, namely the section perimeter, the foundation, spacing elements, the separator, the package, and a serving dish. A comb forming section is provided with the foundation at the bottom thereof and portions cooperating with an adjacent section to effect appropriate spacing of same. In one embodiment, the foundation is backed by a suitably sloped bottom wall for cooperation with an adjacently positioned section and projecting portions at the bottom of the section engage the top of the adjacent section to effect such spacing. In another embodiment, the foundation may lie flat and projecting portions at the top of one section engage the bottom of the adjacent section to effect such spacing. A cover removably fits over the top of a section to form a closed container for marketing. The cover and section may each have a pair of aligned notches in opposite side walls. In an embodiment, the cover and section are locatable in the super with their notches mutually aligned for bee entry into the section and, on removal from the super, the cover is repositionable on the section so the notches in each are blinded by unnotched side portions of the other.

16 Claims, 18 Drawing Figures

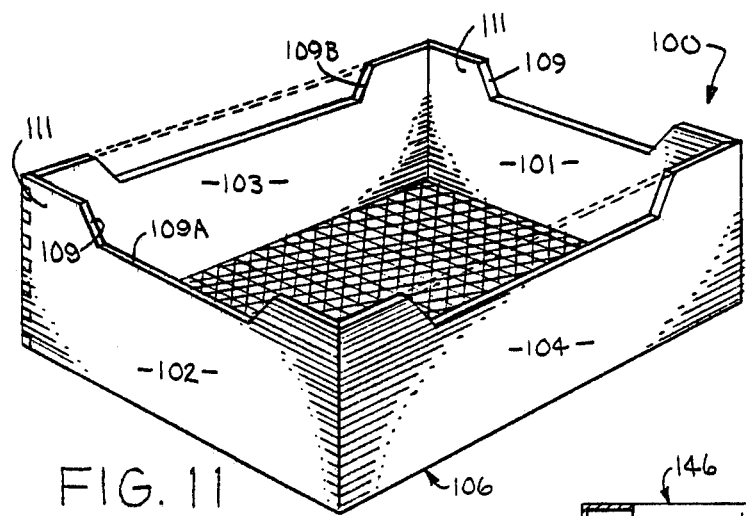
FIG. 11
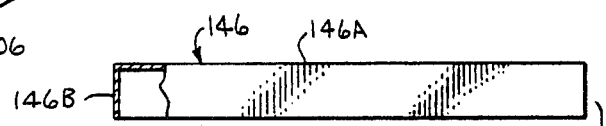
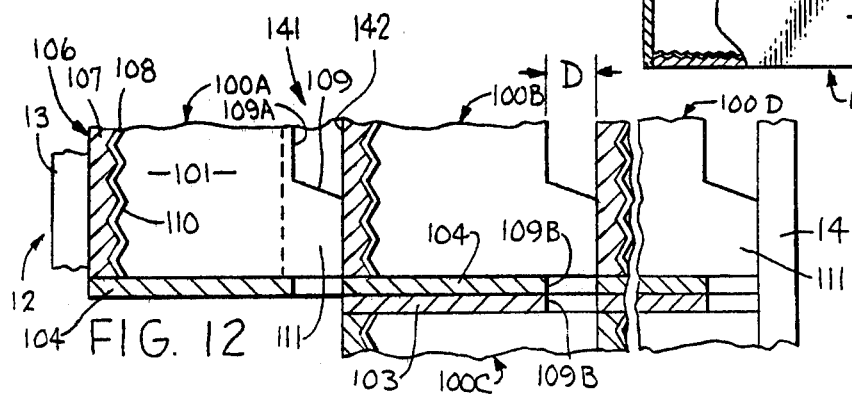
FIG. 13
FIG. 12
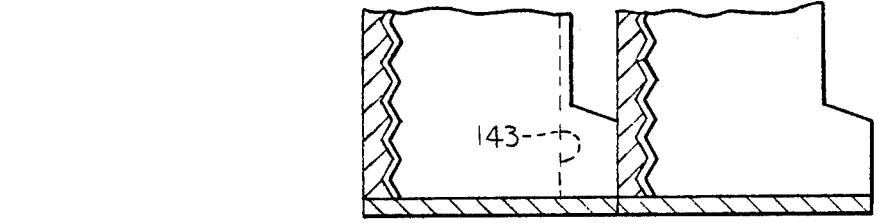
FIG. 14

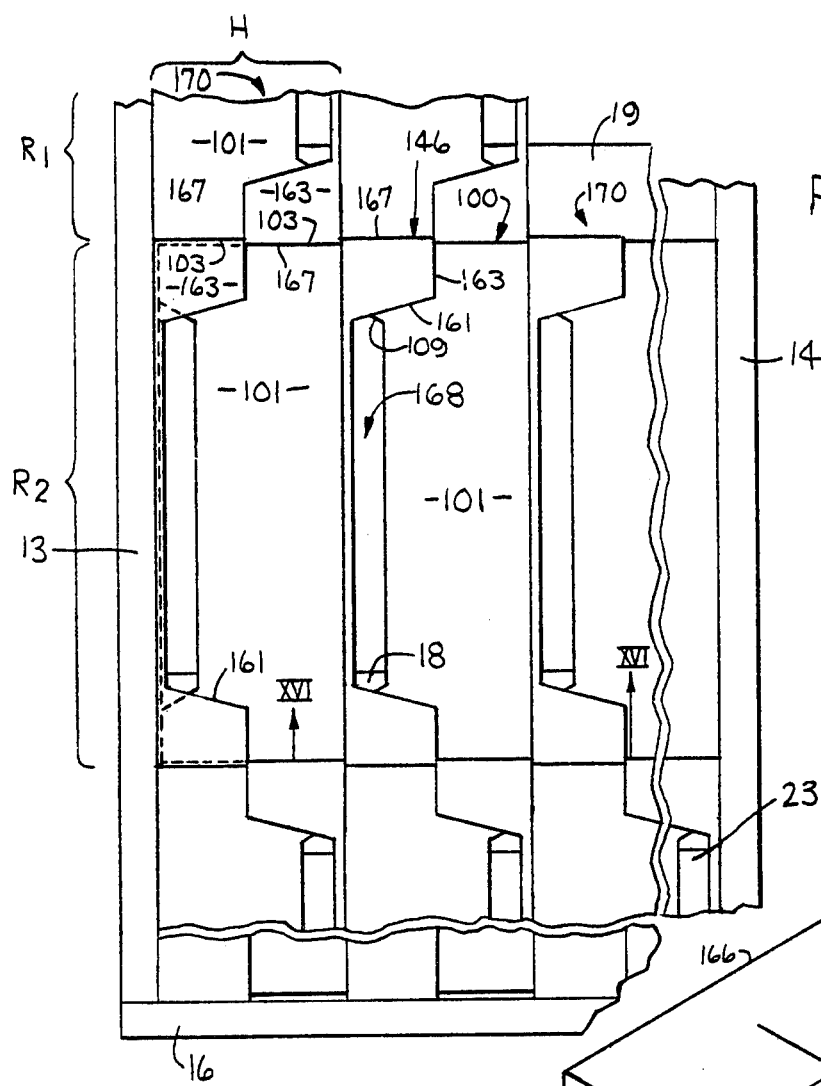
FIG. 15
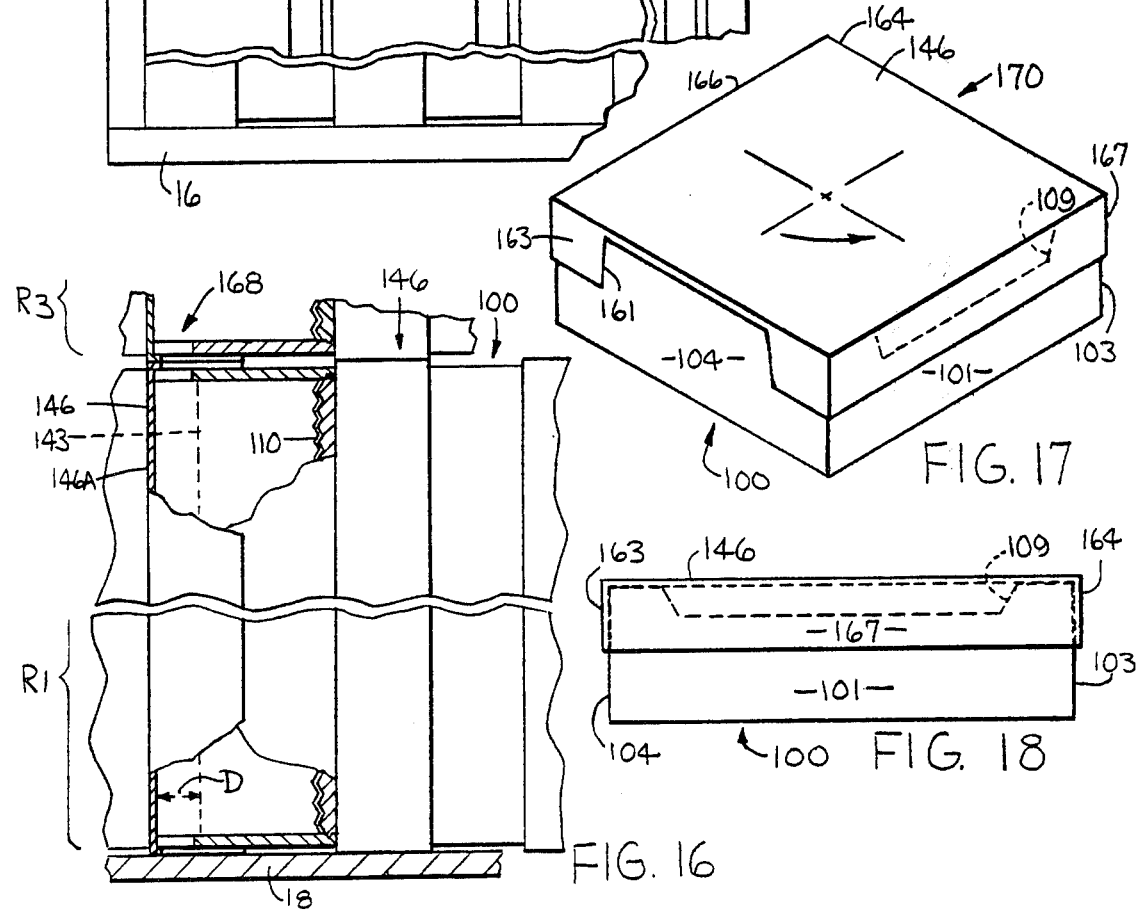
FIG. 17
FIG. 16
FIG. 18

FRAME FOR COMB HONEY

This application is a continuation-in-part of U.S. Application Ser. No. 120,951, filed Feb. 13, 1980.

FIELD OF THE INVENTION

The invention relates to means for the production of comb honey and specifically to a comb section for filling by the bees together with means for positioning same in a proper manner within a super.

BACKGROUND OF THE INVENTION

Although beekeeping, and the obtaining of honey as a product thereof, has been intensively practiced for several hundred years, there has been relatively little change in the means by which same has been practiced since the invention of wax foundation by Johannes Mehring in 1857 and since the basic invention by Langstroth in 1853 of the hive in essentially the form still being used.

While the majority of honey is separated from the comb in which it is formed, there are large numbers of people who regard comb honey as a delicacy. Prior practice, however, in the making of comb honey has required considerable care, attention and inconvenience in the provision and manipulation of the sections in which the comb is to be formed and has further involved at best an inconvenient and messy situation in the serving of such honey at the table.

Particularly in the prior practice, it has been assumed that it is necessary to provide the foundation in the middle of a section whereby the bees will build comb for only approximately ¾ inch on either side thereof. The basis of the present invention is the discovery that the bees will actually build comb consistently without the appearance of burr comb for a distance of at least 1¼ inch from the foundation in one direction only under the conditions set up by the present invention. From this discovery, it follows that the foundation may be placed at the bottom of the section which in turn provides advantages in both the arrangement of the sections within the hive and in the serving to the table of a finished section of comb honey, all of which are set forth further hereinafter.

Accordingly, the objects of the invention include:

1. To provide a novel section for comb honey which will combine into a single unit a number of components which are separate in current practice whereby to make the arrangement within a hive of means for making comb honey more easy and convenient for the beekeeper.

2. To provide a novel section for the production of comb honey, as aforesaid, together with appropriate means for arranging same within a super.

3. To provide a novel comb section and means for arranging same within a super, as aforesaid, which will insure the building by the bees of full and satisfactory sections which will be attractive in appearance and thereby provide a marketable product.

4. To provide a section for the production of comb honey and means for mounting same within a super, as aforesaid, which will be removable after completion of the filling process in a simple and effective manner with a minimum of handling of components other than the sections themselves.

5. To provide sections for the production of comb honey, as aforesaid, which can be utilized directly if desired as the means for packaging, distribution and serving honey at the table.

6. To provide means, as aforesaid, for the production of comb honey with less labor and cost than by current methods and which can be utilized by methods sufficiently similar to presently practiced methods for the production of comb honey that same will be easily employed by a beekeeper familiar with current means and methods for the production of comb honey.

Other objects and purposes of the invention will be apparent to persons acquainted with equipment of this general type upon reading the following specification and inspection of the accompanying drawings.

BRIEF DESCRIPTION OF THE DRAWINGS

In the drawings:

FIG. 11 is a view similar to FIG. 1 but showing a modified embodiment with notches in the tops of two pairs of opposed sidewalls of the section.

FIG. 12 is a view similar to FIG. 4 but providing a fragmentary view of two sections of the type shown in FIG. 11, as arranged within a super for the production of honey.

FIG. 13 is an end view of a section according to FIG. 11, with a cover for packaging comb honey for marketing, both the section and cover being shown partly in cross section.

FIG. 14 is a view similar to FIG. 12 but showing a further modified embodiment in which notches are provided in the top edges of one pair of opposed sidewalls but not of another pair of opposed sidewalls.

FIG. 15 is an enlarged fragmentary top view generally similar to FIG. 3 but showing a series of sections with covers arranged within a super for the production of comb honey and embodying a further modification of the invention.

FIG. 16 is a partially broken fragmentary sectional view taken substantially on the line XVI—XVI of FIG. 15.

FIG. 17 is an oblique view, in reduced scale, of a section-cover unit of the kind shown in FIGS. 15 and 16 but removed from the super and with the cover rotated 90° to form a closed package for marketing.

FIG. 18 is a side view of the FIG. 17 package.

DETAILED DESCRIPTION

Figure 1:
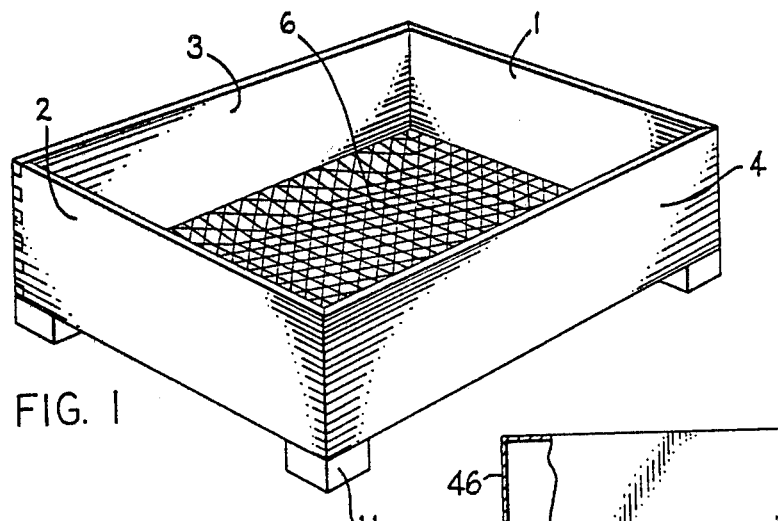
FIG. 1 is an oblique view of a section for comb honey embodying the present invention.

Referring first to the preferred comb honey section embodying the invention, attention is invited first to FIG. 1 wherein there is shown a comb honey section comprising ends (or sides) 1 and 2, sides 3 and 4 and a bottom 6. Said sides may be, and normally are, made of wood as is presently conventional in the provision of comb honey but may, if preferred, be formed of any suitable plastics material acceptable for use with food, such as polyethylene, polypropylene or the like.

The bottom 6 (FIG. 4) comprises a structural portion 7 together with a wax foundation 8. Said structural portion 7 is fixed to the sides 1, 2, 3 and 4 in any convenient manner such as by an adhesive or by being made integral therewith if same is made of a plastics, or other castable or moldable material, and is provided with a sloped portion 9 around its entire perimeter. The exact thickness of said structural portion 7 and the angle of said slope are both important and will be dealt with in more detail hereinafter. The wax component 8 may be a sheet of ordinary foundation wax cut to fit the interior of said section or it may be wax suitably sprayed on a properly embossed surface 10 of the structural portion 7. In some instances it may be possible with a comb section of plastics material to omit the wax surface entirely and, with appropriate embossing of the upper surface of said bottom, permit the bees to build comb directly on the plastics bottom.

The distance from the exposed surface of the foundation 8 will be at least $\frac{3}{4}$ inch and will more often be as much as $1\frac{1}{4}$ inch. Legs 11 are also preferably provided for said sections which legs may be formed in any convenient manner, such as by comprising protrusions from the structural portion 7 or as extensions from the sides 1–4 as desired. In the illustrated embodiment, same are shown as being protrusions from the structural portion 7.

Figure 2:
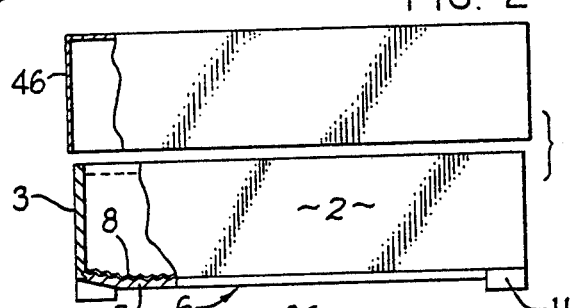
FIG. 2 is an end view of said section together with a cover for use in packaging the honey for marketing, both said section and said cover being shown in a partially sectional view.

There is also shown in FIG. 2 a cover 46 which can be used in the marketing of the honey if desired as further discussed hereinafter.

Figure 3:
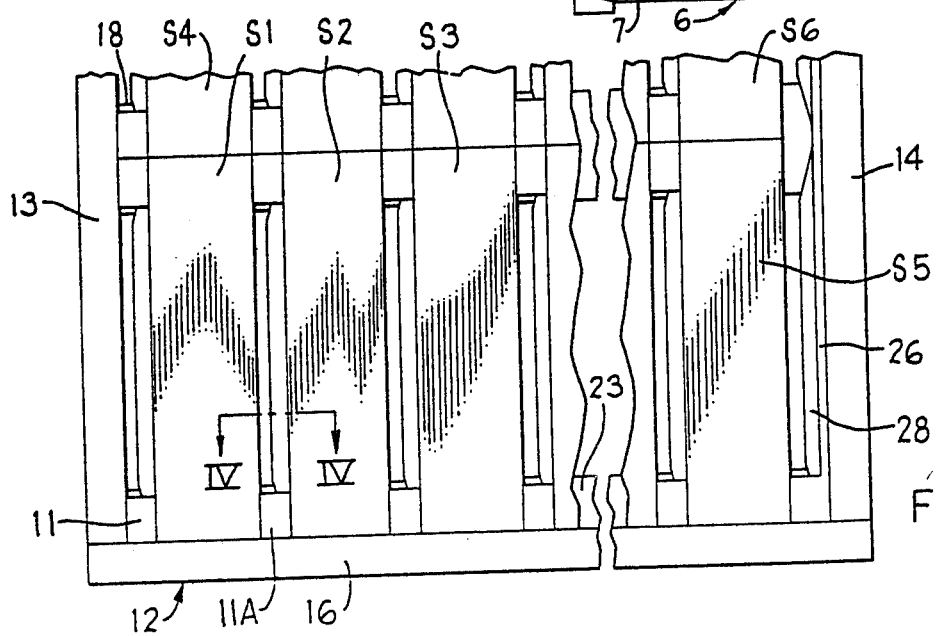
FIG. 3 is a partially broken top view of a series of sections embodying the invention arranged within a super for the production of comb honey.
Figure 5:
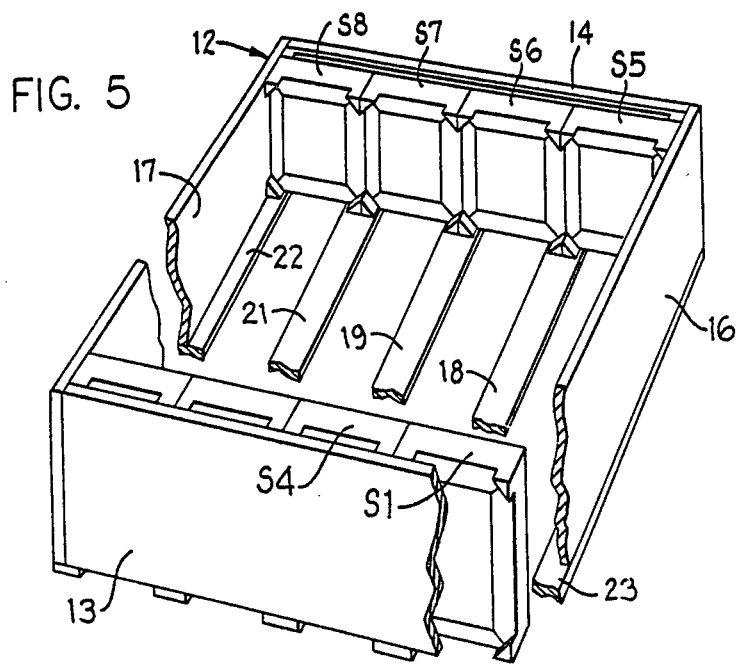
FIG. 5 is a partly broken, partly fragmentary, oblique view of a super with a few of the comb honey sections placed therein in the position for filling by the bees.
Figure 7:
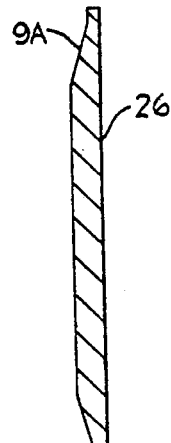
FIG. 7 is a section taken on the line VII—VII of FIG. 6.
Figure 6:
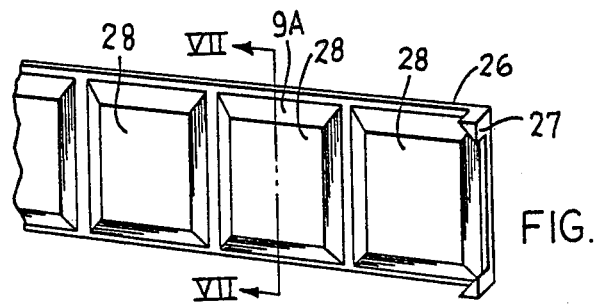
FIG. 6 is an oblique view of an end plate used with said sections.
Figure 8:
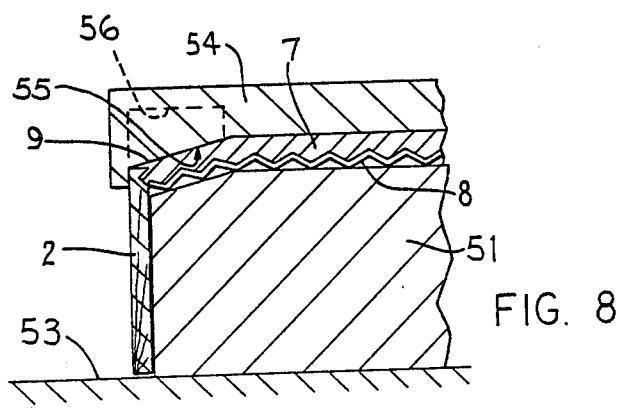
FIG. 8 is a fragmentary sectional view illustrating one means for making the comb honey sections.

Referring now to FIGS. 3 and 5, there is illustrated the manner by which the sections as described are arranged within a super for filling by the bees. The super 12 is itself of generally conventional construction, namely of any desired, normally standard, size with ends 13 and 14 and sides 16 and 17. To such super there is in the present invention added suitable support strips 18, 19 and 21 extending lengthwise across the bottom thereof for a purpose and in a spacing set forth further hereinafter.

The several sections are sized so that a suitable number, usually four, of them will fit snugly between the sides 16 and 17 of the super (FIG. 5). Side support strips 22 and 23 may if desired also be provided along the sides of the super for supporting the edges of the sections and said support strips 18, 19 and 21 are spaced to support adjacent ends of each of said sections as shown. The sections are placed within the super by being merely rested on the bottom supports, section S1 resting on the supports 18 and 23 and being urged against the end 13 and side 16. The legs 11 of section S1 bear against the end 13 to provide space therebetween for bees to travel upward through one super to reach another super superposed thereon. The next section S2 is likewise placed for support upon the strips 18 and 23 and its legs 11A bear against the facing edges of the ends and sides of the section S1 and thereby effect proper spacing of the section S2 from the section S1. Section S3 is arranged likewise on the supports 18 and 23 and bears against the side 16 and is spaced by its legs from the section S2 in the same manner as sections S2 is spaced from section S1. A further section S4 is placed adjacent and contacting the section S1, is supported by bottom strips 18 and 19 and spaced by its legs from the end 13 of the super in the same manner as above described for the section S1. In this manner, the entire super is filled with comb honey sections with the last sections to be installed being sections S5, S6, S7 and S8. The sections are preferably so sized with respect to the interior dimensions of the super that when the last sections are in place and same are all urged (leftwardly as seen in FIG. 3) so that same are all bearing snugly against each other and against the end member 13, there remains a small space, as approximately $\frac{1}{2}$ inch, between the row of sections comprising sections S5–S8 and the end member 14 of the super. This space is then filled by a filler plate 26 having legs 27 thereon corresponding to the legs 11 of the several sections and of such size as to bear snugly against the sections S5–S8 to hold all of said sections snugly within the super. On the filler plate 26, there are also provided raised zones 28 corresponding in size and shape with the structural portions 7 of the several sections.

Thus, said sections can all be placed within the super by merely dropping same into place and the use of the presently common section frame is eliminated.

Figure 9:
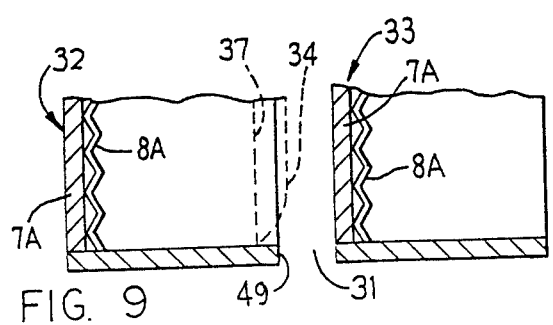
FIG. 9 is a sectional view similar to FIG. 4 and illustrating a modification.

Turning now to the shape and size of said structural component 7 of the bottom 6, same can be best understood by considering first the results obtained if the sloped shape of the bottom of structural member 7 is replaced by a flat bottom surface. For this purpose, attention is now invited to FIG. 9 wherein the bottom of the comb section is flat and wherein some but not all of the advantages of the invention may thus be obtained. FIG. 9 shows two sections 32 and 33 which are similar to sections S1 and S2, excepting for the shape of their respective bottom members, and have a flat bottom structural member 7A. Foundation 8A is similar to foundation 8 and the side and end members of sections 32 and 33 are identical with the corresponding parts of sections S1 and S2. Next, it should be noted that bees require a minimum of between 5/16 and $\frac{3}{8}$ inch for carrying on two-way traffic between a pair of walls or through an opening and require a minimum of 3/16 inch for one-way traffic. This is derived from the fact that the minimum space required for occupancy by a bee ranges from about 5/32 to about 3/16 inch. Thus, if the bottom of a comb section were flat as illustrated in FIG. 9, it would be necessary to provide a minimum of 3/16 inch at the space 31 for entry of bees into the working zone between the two sections 32 and 33 and even that space would be so restrictive as to considerably slow the working of the bees. Thus, the space 31 would facilitate more rapid working by the bees if same were of 3/16 to $\frac{3}{8}$ inch. However, if the space 31 is from 5/16 to $\frac{3}{8}$ inch, there would be a tendency for the surface 34 of the comb in section 32 to approach within about the same distance of the bottom 7A of the section 33 and might in some instances approach even closer. This would make the section 32 somewhat less desirable in appearance and would also, if the surface 34 projects beyond the sides of the section 32, make it more difficult to stack. It is therefore desirable to keep the surface of the comb within section 32 at a level somewhat lower than that of the sides of said section, such as the level indicated by the line 37. This latter is what is accomplished by the structural portion 7 of the preferred form of comb section illustrated in FIGS. 1-8.

Figure 4:
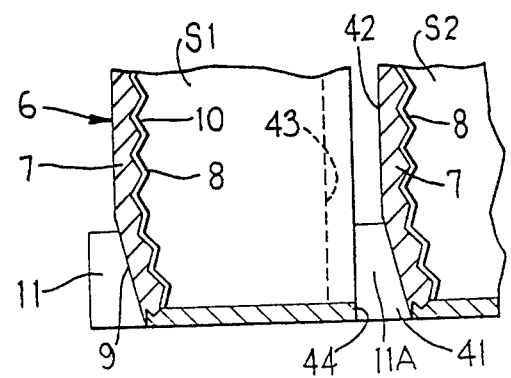
FIG. 4 is a fragmentary view of two of said sections taken on the line IV—IV of FIG. 3.

In this construction, the space 41 (FIG. 4) is determined by the length of the legs 11 of section S2 and will preferably be between 5/16 and ⅜ inch in extent. The surface 42, however, of said structural portion 7 does not project beyond the ends of said legs but it is positioned with respect to said legs 11A such that it moves the working space for the bees slightly to the left as seen in FIG. 4 and thereby holds the surface 43 of the comb in section S1 at a level below the top edge 44 of said section S1. Thus, the maximum needed working space may be provided for the bees, namely the 5/16-⅜ inch dimension, and yet there is no danger of the surface 43 of comb in section S1 projecting beyond the upper edges as the edge 44 of section S1. Specifically if, for example, the surface 42 is approximately 3/16 of an inch above (to the right in FIG. 4) the bottom surface (leftward in FIG. 4) of the leg 11A, and said leg 11A is ⅜ inch long, then the surface 43 of the comb in section S1 will remain at least ¼-⅜ inch to the left of said surface 42 and thus approximately 1/16-3/16 inch below (to the left in FIG. 4) the upper edges, as the edge 44, of said section S1. This provides maximum working space for the bees while still maintaining the surface in each comb section at a desirable contour and location.

The raised portions 28 of the strip 26 are shaped to function with respect to the comb sections S5-S8 in the same manner as above described for the structural portion 7 of section S2 with respect to the surface of the comb in section S1.

Figure 10:
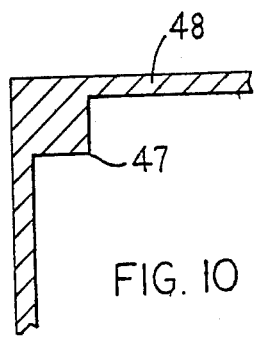
FIG. 10 is a sectional view of a cover appropriate for use with the modification of FIG. 9.

When the honey is removed from the super, each section is independent of every other section and may be marketed directly without further processing. A cover, as the cover 46 (FIG. 2), may be provided for fitting over the top of each of said sections and same may be printed and/or illustrated as desired. Said cover may be of paper, fiberboard, plastic or other material as convenient. If flat bottomed sections such as shown in FIG. 9 are used, it will then often be desirable to provide a small step in the cover, as at 47 in FIG. 10 in order to space the web 48 of this cover slightly above the top, as edge 49, of a section such as the section 32 whereby to enable said web 48 to clear any upwardly rising comb such as that illustrated by line 34 in FIG. 9.

The fabrication of the comb sections of the invention may as already indicated be of any convenient nature. In the illustrated embodiment, the side and end components 1-4 are made of wood and the structural portion 7 together with the legs 11 are made of plaster of paris. This is accomplished by first laying a piece of conventional wax foundation 8 cut to the appropriate size on top of a block 51 and then dropping the sides 1-4 of a section downwardly in a manner surrounding said block, the level of the limiting surface 53 (or the height of block S1) being desirably chosen to permit an inwardly notched portion of each side to extend above the wax foundation 8. The space then within said side and end walls 1-4 and above the comb foundation is filled with plaster of paris and a suitable die member 54 pressed downwardly thereon. Said die member has an appropriate slope 55 to provide the sloped surfaces 9 as above described and is further provided with suitable cavities, of which one is indicated at 56, for the formation of the legs 11. Upon hardening of the plaster of paris, the die member 54 is removed and the comb section is complete and ready for use.

If said comb section is made from a plastics material, then any conventional molding technique, normally injection molding, may be used and in such case the foundation wax 8, if used, will be applied in any convenient manner, such as by an appropriate piece being pushed into place or by the wax being sprayed upon a suitably embossed surface of the plastic bottom. However, any desired fabrication technique may be used as well as a wide range of materials as convenient as will be apparent to those skilled in the art.

It will be recognized that the comb sections may be made of any desired shape as selected for marketing purposes. While they are normally and conveniently of square or rectangular shape as shown, same may be of other shapes, such as triangular, hexagonal or circular provided, however, that if a shape is utilized which does not nest snugly within a super, then suitable plugs will need to be provided to fill the intervening spaces and prevent the bees from forming burr comb therein.

It will be seen that the comb sections of the invention are easily made, extremely easy to utilize and greatly facilitate the marketing of the finished product. They are highly versatile in available shapes and sizes but maintain maximum efficiency in their adaptability to the bees' habits and honey producing procedures.

MODIFICATIONS

The comb honey section 100 of FIG. 11 comprises sides 101, 102, 103 and 104 and a bottom 106 comprising a downward facing structural portion 107 (FIG. 12) and a foundation 108 having an embossed surface 110 for building of honeycomb thereon by bees. Preferably the structural portion 107 lies flush with the opposing surface of foundation 108 or is integral therewith.

At least two opposed sides 101 and 102 have elongate notches 109 along the major central length of the top edges thereof. The notches are aligned with each other along an axis transverse to the sides 101 and 102. Top edge portions 111 of the sides flank the notches 109 and project upward beyond the bottoms 109A of the notches 109. As hereinafter discussed, it will in some instances, particularly as to FIGS. 15-18, be desirable to provide notches 109 in only two opposed sides 101 and 102 of the section, with the remaining sides unnotched, in accord with the dotted line representation at the top sides 103 and 104 in FIG. 11. However, in other instances it may be desired to provide notches in additional opposed pairs of side walls (as in solid lines at the top of sides 103 and 104 in FIG. 11, and in FIG. 12).

In FIG. 12, successive sections are placed open top to closed bottom (for example as at 100A, 100B) to form a row of sections extending along the support strips (as at 19) of a super (as at 12 in FIG. 5). A second row of sections 100C may extend beside the first, and so on with additional rows to fill the super. In the super, the notches 109 are aligned on a common vertical axis with corresponding notches of further sections disposed thereabove and therebelow, which further sections may be carried in additional supers. The aligned notches 109 thus provide vertical paths of travel for the bees through vertically aligned sections in stacked supers of the hive. In each horizontal row of sections, the bottom plate 107 and top edge portion 111 of the endmost sections 100A and 100D lie snugly adjacent the respective super ends 13 and 14, without need for a filler plate as at 26 in FIG. 6. Intermediate the ends of the row, the top edge portion 111 of each section 100A snugly engages the bottom surface 142 of bottom 106 such that the depth D of the access opening 141 for bees into the interior of the section is substantially the depth of the notch 109. The depth D is sufficient for one- or two-way traffic of bees, and thus between about 3/16 inch and ⅜ inch.

In view of the working space required by the bees, namely, between ¼ inch and ⅜ inch, the bees will build comb in a section in a direction away from the foundation 108 (toward the right in FIG. 12) up to about this distance from the opposing bottom surface 142 of the next section in the row. Thus, the top of the completed comb, indicated in broken lines in FIGS. 12–14 and 16 at 143 will normally lie slightly above or below the bottom 109A of notch 109. In any event, the structure shown does not permit the bees to build comb up to the top edge portions 111 of the sides. Accordingly, once the bees have completed building of comb in the sections, the sections can be removed from the super. By placing a cover, as at 146 (FIG. 13) over the exposed face of the comb, comb honey can be marketed without further packaging. Restated, the comb filled section closed by cover 146 constitutes goods and completed container for marketing. The cover 146 here is of downward opening box shape corresponding to the shape of the section and with a closed top wall 146A and depending side walls 146B of depth exceeding the depth of the notches 109 so as to close such notches when the cover is installed over the open top of the section. Preferably the corresponding top and bottom of the cover and section are rectangular in plan, although other geometric shapes are contemplated. The cover may be of transparent material so the customer can see the product. Also, the cover is reclosable by the consumer to protect the unconsumed portion.

Thus, in view of the fact that the depth of the notches can be selected to permit access of bees to the section and the fact that the surface of the comb will always be spaced below the bottom of the adjacent section, it is no longer necessary to bevel the outer surface of the section bottom as in the above-described embodiment of FIGS. 1–8, and elimination of bevel simplifies the manufacturing of the section.

As seen in FIG. 12, by providing further notches 109B in the second pair of opposed sides 103 and 104 of each section and orienting the sections in adjacent rows with their open tops facing in the same direction (rightwardly in FIG. 12), then the notches 109B in sides 103 and 104 of side-by-side sections 100C and 100B will align and permit bees to travel therethrough sidewardly from section to section. Where such sideward travel of bees is not desired, the second pair of notches may be omitted as in FIG. 14.

In the further modification of FIGS. 15–18, the section 100 has notches 109 in the top edges of only one pair of opposed sides 101 and 102 (as in FIG. 14 and in broken lines in FIG. 11), and all sides of the section are of equal length, such that the FIGS. 15–18 section is square in plan. The cover 146 in FIGS. 15–18 is modified by provision of a notch 161 extending deep into each of two opposed side walls 163 and 164.

As discussed with respect to FIG. 13, the cover 146 may be located to close the comb-filled section 100 for marketing. In FIGS. 16 and 17 this is done by placing the cover 146 on the section 100 with the cover notches 161 placed over unnotched section sides 103 and 104 and the notches 109 in the section covered by the unnotched sides 166 and 167 of the cover.

The cover 146 is instead placeable (by rotation through 90° as indicated by arrow A in FIG. 17) to overlap the notched cover sides 163 and 164 with corresponding notched section sides 101 and 102 (or vice versa), as in FIGS. 15 and 16, for placement in the hive for the bees to fill. In this position, each cover notch 161 aligns with a section notch 109 to form bee access holes 168. The notches 109 and 161 are preferably centered along their corresponding sides and are preferably co-extensive in length. The cover notch 161 is preferably maximized in depth, extending substantially to the top 146A of the cover 146. These features maximize the depth and longitudinal extent of the bee access opening 168 formed by the aligned section notch and cover notch. The cover 146 and section 100 thus assembled to open the bee access holes 168 form a comb building unit 170 installable in a super as in FIGS. 15 and 16. More particularly, such comb building units 170 are arranged top to bottom in rows, running from right to left in FIG. 15 with the endmost units of each row snugly sandwiched between the ends 13 and 14 of the super. Thus, the top 146A of the cover 146 of one unit 170 engages the bottom of the section of the next in that row. As in FIGS. 11–14, comb construction by the bees proceeds from the foundation surface 110 (FIG. 16) toward the open end of the section, in this instance toward the interior surface of the top wall 146A of the corresponding cover 146 and comb making by the bees stops at a level near the broken line 143, and thus normally in spaced relation from the interior surface of the cover 146. The cover may be of any convenient material not conducive to building of comb thereon by bees. Thus, there is the gap D which is normally left free of comb by the bees so as not to interfere with repositioning of the cover to the marketing position on its section as in FIGS. 17 and 18.

To positively prevent bees from filling with resins the cracks between adjacent rows of units 170 in the super, the units 117 adjacent rows R1 and R2 (FIG. 15) are directed with their covers facing in opposite directions. For the same purpose, the depth of the sides 163–167 is made equal to or slightly less than the effective height H, from top to bottom, of a given unit 170. Thus, the adjacent sides 167 of covers in adjacent rows R1 and R2 will lie in interlocked alignment along the length of the rows. In this way, the side 167 of a cover in one row can lie flush against the side 103 of a section in the next row. Accordingly, the interface of adjacent rows is free of openings into which bees can penetrate and build comb, even if the sides 166 and 167 of the covers are of substantial wall thickness.

The units 170 in their comb-building mode of FIGS. 15 and 16 can be contained in supers which are only one unit 170 high (the height of the FIG. 5 super). However, it is also possible to stack a row R3 (FIG. 16) of units 170 atop another row R1 as shown in FIG. 16, if desired, wherein the covers in stacked rows R1 and R3 face in the same direction (here leftwardly) and have their bee access holes 168 vertically aligned.

Even if, in a rare instance, the bees bridge the space between the comb and the inner surface of the cover with burr comb and so tend to adhere the cover to the section, and thereby make it difficult to separate the two for repositioning from their FIG. 15 comb-building position to their FIG. 17 marketing position, the thus bridging comb will tend to produce a closed and marketable container of comb honey, without need to reposition the cover to its FIG. 17 position.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for producing comb honey in a hive having a hive body, the combination comprising:
   a super for superposing on the hive body and having ends and sides;
   a plurality of separate comb sections positioned within said super, each of said sections having perimeter components with top and bottom edges;
   means for inducing bees to build comb only in one direction within a said section and to a predetermined depth therein, wherein each of said sections has a bottom wall connecting the bottom edges of said perimeter components, said bottom wall has a foundation surface facing into its said section, the top of one section is adjacent the bottom wall of the next section, and means project from the top of said one section in cooperative relation with the bottom wall of the next section for permitting bee access and effecting comb depth control in said one section.

2. The device of claim 1 wherein at least one said perimeter component of each of said sections includes a said top edge which is provided with a notch along at least a portion of its length, the portions of said top edge separated by said notch comprising said projecting means, said notch providing appropriate access for the bees between the bottom of said notch in said one section and the bottom wall of the next section.

3. The device of claim 1, in which the top and bottom of said super are substantially open, aligned notches in two opposed sides of a section facing toward the open top and bottom of said super such that said supers are packable with the aligned notches of one section in turn aligned with aligned notches of a section in the next super, so as to provide a stack of supers in which said aligned notches create a path for bees through successive supers along the bottoms of successively stacked sections.

4. The device of claim 1, wherein
   said projecting means define an entry for bees into said one section comprising an opening along said top edge of a said perimeter component remote from said bottom wall of said one section and immediately adjacent the bottom wall of said next section, the bottom wall of said next section having a substantially flat central surface portion facing into the adjacent first mentioned section; and
   said projecting means are located cooperatively with the bottom wall of said next section for regulating the comb honey surface formed by the bees in said one section, namely wherein said projecting means spaces said flat central bottom wall surface portion of said next section in opposition to said foundation in the bottom of said one section.

5. In a device for producing comb honey in a hive having a hive body, the combination comprising:
   a super for superposing on the hive body and having ends and sides;
   a plurality of separate comb sections positioned within said super, each of said sections having perimeter components with top and bottom edges;
   means for inducing bees to build comb only in one direction within a said section and to a predetermined depth therein, wherein each of said sections has a bottom wall connecting the bottom edges of said perimeter components, said bottom wall has a foundation surface facing into its said section, the top of one section is adjacent the bottom wall of the next section, and means project from the top of said one section in cooperative relation with the bottom wall of the next section for permitting bee access and effecting comb depth control in said one section, wherein said projecting means define a notch in the top edge of a perimeter component of said one section, and including a cover for said one section, said cover having sides with top and bottom edges and a top wall connecting said top edges, said cover being sized to removably fit over the top of said one section, said sides of said cover being at least as deep as said notch to substantially overlap said notch with said cover installed on said one section to enclose contents of said one section for marketing.

6. In a device for producing comb honey in a hive having a hive body, the combination comprising:
   a super for superposing on the hive body and having ends and sides;
   a plurality of separate comb sections positioned within said super, each of said sections having perimeter components with top and bottom edges;
   means for inducing bees to build comb only in one direction within a said section and to a predetermined depth therein, wherein each of said sections has a bottom wall connecting the bottom edges of said perimeter components, said bottom wall has a foundation surface facing into its said section, the top of one section is adjacent the bottom wall of the next section, and means project from the top of said one section in cooperative relation with the bottom wall of the next section for permitting bee access and effecting comb depth control in said one section, in which said projecting means define a notch in the top edge of a perimeter component of said one section, and including a cover having a top wall and side walls, said cover being removably fitted over the top of said one section adjacent the bottom said next section, a said side wall of said cover having a notch aligned with said notch in said one section to form a closed perimeter hole remove from the bottom wall of said one section for entry of bees into the thus covered section.

7. The device of claim 6, in which the depth of the sides of said cover exceed the depth of the notch in said one section, said cover being repositionable on said one section upon removal from said super in such manner that the notches in said one section and cover are blinded by non-notched parts of the sides of said cover and section respectively, whereby said cover and section together form a closed container for marketing comb honey.

8. The device of claim 6, in which said super contains a first row of comb units each comprising a section with a cover installed thereon and with the notches in said cover and section aligned to form said holes for access of bees to the section interior, the sides of said cover partly overlapping said section sides, the top of said cover of one comb unit in said row abutting the bottom wall of the section of the next comb unit in said row.

9. The device of claim 8, in which a second row of comb units placed next to said first row has cover tops facing the same way as the section bottom walls of said first row, said cover sides being about one-half the depth of said section sides such that a cover side in said first row nests substantially in coplanar relation between two cover sides in said second row, to thereby substantially eliminate spaces between rows in said super.

10. The device of claim 8, wherein a second row of comb units rests atop said first row of comb units with covers and sections and access holes of said second row aligned above corresponding covers and sections and access holes of the first row to allow passage of bees vertically through the super, double the material thickness of a side of a cover being less than the access space and working height required by a bee.

11. A comb section for the production of honey, comprising:
- perimeter means defining the sides of said section and closure means along the bottom edge of said perimeter means for defining a bottom wall of the section;
- foundation means on the upper face of said bottom wall for facilitating the building of honeycomb thereon and within the space defined by said bottom and said perimeter means;
- said perimeter means being provided with a notch along the top edge of at least one portion of said perimeter means for admitting bees into said comb section, wherein said notch leaves another portion of said top edge protruding up beyond the bottom of said notch, said protruding portion of said top edge cooperating with the bottom face of an adjacent second section, the bees being provided with sufficient space to pass between said bottom face of said second section and the bottom of the notch in the top edge of the first said section while the working space required by the bees will limit the building of comb to a level below the top edge of said first section.

12. The device of claim 11, wherein the depth of said notch is between about 3/16 inch and about ⅜ inch.

13. The device of claim 11, wherein the distance from the upper surface of said foundation means to the top edge of said sides of said section is between ¾ inch and 1¼ inch.

14. A comb section for the production of honey, comprising:
- perimeter means defining the sides of said section and closure means along the bottom edge of said perimeter means for defining a bottom wall of the section;
- a foundation means on the upper face of said bottom wall for facilitating the building of honeycomb thereon and within the space defined by said bottom and said perimeter means;
- said perimeter means being provided with a notch along the top edge of at least one portion of said perimeter means for admitting bees into said comb section; and
- a cover for said section, said cover having sides with top and bottom edges and a top wall connecting said top edges, said cover being sized to fit over the top of said section, said sides of said cover being at least as deep as said notches to substantially overlap said notches with said cover installed on said section, to enclose the contents of said section for marketing.

15. In a device for producing comb honey in a hive having a hive body, the combination comprising:
- a super for superposing on the hive body and having ends and sides;
- a plurality of comb sections positioned within the super, each of said sections having perimeter components with top and bottom edges;
- each of said sections having a bottom wall connecting the bottom edges of said perimeter components and having a foundation surface thereon facing inside said section for building of comb by bees;
- one section having a first opening along said top edge of a said perimeter component remote from said bottom wall of said one section and immediately adjacent said next section;
- a cover having sides with top and bottom edges and a top wall connecting said top edges, said cover being removably fitted over the top of said one section and thus adjacent the next section, a side of said cover having a second opening cooperative with said first opening in said section perimeter component for entry of bees into said one section;
- means for regulating the height of the comb surface formed by the bees in said one section with respect to the top edge of said perimeter component of said one section, said means comprising the bottom surface of said top wall of said cover.

16. The device of claim 15, said one section and the cover being removable from said hive as a unit, said cover and section having shapes cooperative such that said cover is replaceable on said section with the openings in said cover and section out of alignment and a portion of a side of said cover blinding said opening in said perimeter component of said section.

* * * * *

UNITED STATES PATENT AND TRADEMARK OFFICE
CERTIFICATE OF CORRECTION

PATENT NO. : 4 435 865
DATED : March 13, 1984
INVENTOR(S) : John A. Hogg

It is certified that error appears in the above-identified patent and that said Letters Patent is hereby corrected as shown below:

Column 9, line 38; change "claim 1" to ---claim 2---.

Column 10, line 50; change "remove" to ---remote---.

Signed and Sealed this

Twenty-fifth Day of September 1984

[SEAL]

Attest:

GERALD J. MOSSINGHOFF

Attesting Officer          Commissioner of Patents and Trademarks